(12) United States Patent
Gremplini et al.

(10) Patent No.: US 7,648,012 B2
(45) Date of Patent: Jan. 19, 2010

(54) DUAL CLUTCH ARRANGEMENT

(75) Inventors: Hansi Gremplini, Freiberg (DE); Kuno Fronius, Lauffen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/741,715

(22) Filed: Apr. 27, 2007

(65) Prior Publication Data

US 2007/0256907 A1 Nov. 8, 2007

Related U.S. Application Data

(63) Continuation of application No. PCT/EP2005/011519, filed on Oct. 27, 2005.

(30) Foreign Application Priority Data

Nov. 5, 2004 (DE) .................. 10 2004 055 361

(51) Int. Cl.
*F16D 25/10* (2006.01)
(52) U.S. Cl. .................. 192/87.11; 192/106 F
(58) Field of Classification Search ............... 192/106 F
See application file for complete search history.

(56) References Cited

U.S. PATENT DOCUMENTS

| | | | |
|---|---|---|---|
| 6,021,879 A | 2/2000 | Pelouch | |
| 7,021,422 B2 | 4/2006 | Busold et al. | |
| 7,147,095 B2 | 12/2006 | Kraxner et al. | |
| 7,246,692 B2 * | 7/2007 | Braford | 192/87.11 |
| 2001/0035328 A1 | 11/2001 | Tanikawa | |
| 2003/0116396 A1 * | 6/2003 | Kuhstrebe | 192/48.9 |
| 2004/0206599 A1 | 10/2004 | Hegerath | |
| 2005/0067251 A1 * | 3/2005 | Braford et al. | 192/70.12 |
| 2006/0042909 A1 * | 3/2006 | De Maziere | 192/87.11 |
| 2006/0144665 A1 * | 7/2006 | Janson et al. | 192/48.8 |
| 2006/0289269 A1 * | 12/2006 | Tiesler | 192/87.11 |

FOREIGN PATENT DOCUMENTS

| | | |
|---|---|---|
| DE | 100 04 179 A1 | 4/2001 |
| DE | 10118756 | 5/2002 |
| DE | 101 33 638 A1 | 1/2003 |
| DE | 10231405 | 2/2003 |
| DE | 102 23 780 C1 | 10/2003 |
| DE | 203 20 464 U1 | 9/2004 |
| DE | 203 20 467 U1 | 10/2004 |
| DE | 10 2004 013 265 A1 | 3/2005 |
| EP | 0 282 169 A1 | 2/1988 |
| JP | 62052249 A * | 3/1987 |
| WO | WO 2004/104439 A1 | 12/2004 |

\* cited by examiner

*Primary Examiner*—Richard M. Lorence
(74) *Attorney, Agent, or Firm*—Knobbe, Martens, Olson & Bear, LLP

(57) ABSTRACT

A dual clutch arrangement for a dual clutch transmission for motor vehicles, having a first and a second friction clutch which are each fluidically actuable. A first piston arrangement serves to actuate the first friction clutch and has a first piston, a first piston space and a first centrifugal force equalizing space. A second piston arrangement serves to actuate the second friction clutch and has a second piston, a second piston space and a second centrifugal force equalizing space. The piston spaces and the centrifugal force equalizing spaces are situated in each case on opposite sides of the associated piston and are connected by means of feed lines to a valve arrangement.

14 Claims, 2 Drawing Sheets

DUAL CLUTCH ARRANGEMENT

BACKGROUND OF THE INVENTION

The present invention relates to a dual clutch arrangement for a dual clutch transmission for motor vehicles, having a first and a second friction clutch which are each fluidically actuable, a first piston arrangement which serves to actuate the first friction clutch and has a first piston, a first piston space and a first centrifugal force equalizing space, a second piston arrangement which serves to actuate the second friction clutch and has a second piston, a second piston space and a second centrifugal force equalizing space, with the piston spaces and the centrifugal force equalizing spaces being situated in each case on opposite sides of the associated piston and being connected by means of feed lines to a valve arrangement.

A dual clutch arrangement of said type is generally known.

Dual clutch transmissions have a dual clutch arrangement and two partial transmissions. The partial transmissions are generally designed as layshaft transmissions. Here, one of the partial transmissions is assigned to the even gear stages, and the other partial transmission is assigned to the odd gear stages.

It is consequently possible, by means of overlapping actuation of the two clutches of the dual clutch arrangement, to carry out a gearshift without an interruption in tractive force.

Said type of dual clutch transmission is suitable for motor vehicles, in particular for passenger vehicles.

Nowadays, fluidically operated friction clutches, for example wet-running multiplate clutches, are generally used in dual clutch arrangements.

It is often preferable here, in order to attain a short axial design, for the two dual clutches to be nested one inside the other radially, with one friction clutch being situated radially at the inside and the other being situated radially at the outside.

In order to supply fluid, in particular hydraulic oil, to the friction clutches, it is known to provide a rotary leadthrough with a spigot section onto which is placed a common hub of the two dual clutches.

Here, in a known dual clutch arrangement, in each case four ducts are provided on the rotary leadthrough and on the hub, with two of the ducts being assigned to the two piston spaces, and with the other two ducts being assigned to the two centrifugal force equalizing spaces.

Here, the duct for the first piston space is situated axially at one end. Adjacent thereto is a duct for the first centrifugal force equalizing space. Adjacent thereto is in turn a duct for the second piston space, and arranged at the axially other end is a duct for the second centrifugal force equalizing space.

BRIEF SUMMARY OF THE INVENTION

It is the object of the present invention to specify an improved dual clutch arrangement.

Said object is achieved in the dual clutch arrangement specified in the introduction in that the centrifugal force equalizing spaces are connected to the valve arrangement by means of a common line.

In a second aspect of the present invention, the object is achieved in the dual clutch specified in the introduction in that the friction clutches are embodied as radially nested multiplate clutches and have in each case one inner plate carrier and one outer plate carrier, with the input member of the radially outer multiplate clutch being the outer plate carrier and with the input member of the radially inner clutch being the inner plate carrier.

It is possible by means of the measures as per the first aspect of the invention to provide an axially more compact dual clutch arrangement overall, in particular since fewer feed lines to the piston spaces and fluid equalizing spaces are required for introducing fluid. There is also a resulting weight advantage.

With the dual clutch arrangement as per the second aspect of the present invention, it is likewise possible to achieve a small installation length and a resulting weight advantage.

In the dual clutch arrangement according to the present invention, it is advantageous if the friction clutches have in each case one input member, with the input members being mounted on a hub and with the hub being rotationally fixedly connected to a drive input shaft.

Said measure generally permits an axially compact construction of the dual clutch arrangement.

Here, it is particularly advantageous if the drive input shaft is connected to the hub by means of a cage which radially surrounds the friction clutches.

It is advantageously possible by means of said measure to provide that the drive output members of the friction clutches are guided radially past the hub in the vicinity of the drive input shaft.

According to a further preferred embodiment, the hub is mounted on a spigot section, which is fixed to the housing, of a rotary leadthrough.

It is hereby possible to provide that the friction clutches are supplied with fluid for their operation via the rotary leadthrough and the hub.

It is particularly advantageous here if the hub has radial ducts in order to supply the friction clutches with fluid.

It is also advantageous here if the hub has at least two radial actuating ducts for actuating the two friction clutches. In the present context, the term "radial duct" is to be understood in a broad sense. In the illustration of the radial ducts and of the associated rotary leadthrough, a longitudinal section view is generally assumed in which, thus, in each case only one radial duct or one projection of radial ducts can be seen. It is however self-evident that a radial duct can for example also be understood as a plurality of individual ducts, for example bores, which are distributed in the peripheral direction. An individual radial duct is also to be understood within the context of the present invention as when two individual ducts which are offset in the peripheral direction are connected to one single annular duct of a rotary leadthrough, but radially outwardly deviate from one another in the axial direction.

The rotary leadthrough preferably has an annular duct which forms the common line to the two centrifugal force equalizing spaces.

Here, it is particularly advantageous if the annular duct is arranged in the axial direction between the two actuating radial ducts.

It is possible by means of said measure to connect the annular duct to the two centrifugal force equalizing spaces, in particular when the latter are arranged adjacent to one another in the axial direction between the two piston spaces.

According to a further preferred embodiment, the hub has at least one first radial auxiliary duct, which is connected to the first centrifugal force equalizing space, and at least one second radial auxiliary duct which is connected to the second centrifugal force equalizing space, with the radial auxiliary ducts being connected radially at the inside to the annular duct.

Here, the radial auxiliary ducts can on the one hand be composed in each case of radially outwardly branching, in each case interconnected ducts. It is however preferable for the first radial auxiliary duct and the second radial auxiliary duct to be offset relative to one another in the peripheral direction. Only one individual radial duct can be seen in a projection in the peripheral direction, so that in the present case, for simplicity, reference is at some points made to "one" radial auxiliary duct.

Here, it is also particularly advantageous for an input member of one of the friction clutches to be connected to the hub in a region between the two radial auxiliary ducts.

In this way, the input member of said friction clutch can be used as a separating member between the two centrifugal force equalizing spaces. The friction clutch whose input member is connected to the hub in this way is preferably a radially inner friction clutch.

According to a further preferred embodiment, the annular duct serves to supply at least one of the friction clutches with cooling fluid.

According to a further preferred embodiment, the centrifugal force equalizing spaces are fluidically connected to one another.

The centrifugal force equalizing spaces are generally always in an unpressurized state, that is to say are supplied with fluid which is not pressurized. If, for example, a clutch is actuated by introducing pressurized fluid into the associated piston space, fluid is forced out of the associated centrifugal force equalizing space. This is easier to provide if the two centrifugal force equalizing spaces are fluidically connected to one another. There is in particular no requirement for complicated duct arrangements in the rotary leadthrough and/or in the hub.

It is however generally also conceivable, in the case of the adjacent centrifugal force equalizing spaces, for the latter to be fluidically connected to one another for example by means of openings in a separating member (such as an input member of a radially inner friction clutch).

According to an embodiment which is preferable overall, the friction clutches are embodied as radially nested multiplate clutches, or multiplate clutches which are arranged one inside the other, and have in each case one inner plate carrier and one outer plate carrier.

In said embodiment, it is particularly advantageous for the input member of the radially outer multiplate clutch to be its outer plate carrier and for the input member of the radially inner clutch to be its inner plate carrier.

In this way, it is provided in a structurally simple manner that the dual clutch arrangement can be of an axially short overall design.

It is self-evident that the features stated above and the features yet to be explained in the following can be used not only in the respectively specified combination but also in other combinations or individually without departing from the scope of the present invention.

BRIEF DESCRIPTION OF THE DRAWINGS

Exemplary embodiments of the invention are illustrated in the drawing and are explained in more detail in the following description. In the drawing.

DETAILED DESCRIPTION OF THE INVENTION

Figure 1:
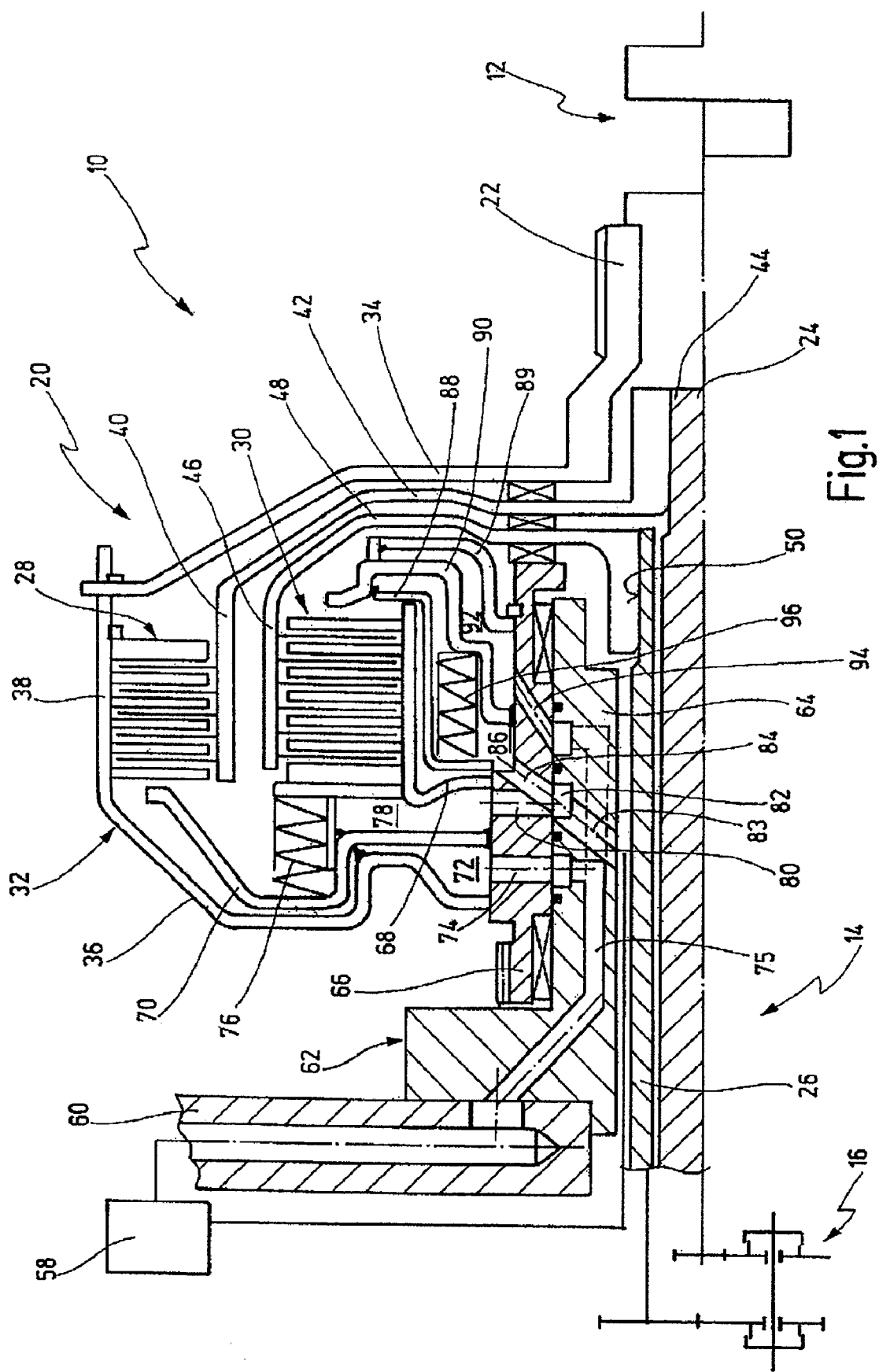
FIG. 1 shows a schematic longitudinal section view of a dual clutch arrangement (half-section view of a substantially rotationally symmetrical arrangement) as per one embodiment of the present invention, in conjunction with associated components of a dual clutch transmission.

In FIG. 1, a drivetrain for a motor vehicle is denoted generally by 10.

The drivetrain 10 has a schematically indicated internal combustion engine 12 whose output is connected to a dual clutch transmission 14.

The drivetrain 10 is particularly suitable for motor vehicles. The motor for driving the motor vehicle can be the internal combustion engine 12 or any other desired drive motor such as for example an electric drive, a hybrid drive or the like.

The dual clutch transmission 14 contains a multistep transmission, denoted schematically in the figure by 16, which is designed as a layshaft transmission and contains two partial transmissions.

In addition, the dual clutch transmission 14 has a dual clutch arrangement 20 whose input is connected to the output of the internal combustion engine 12 and which is connected at the output side to the multistep transmission 16.

More precisely, the dual clutch transmission 20 has an input shaft 22 which can be rotationally fixedly connected by means of a toothing or the like to the drive output shaft of the internal combustion engine 12.

The dual clutch arrangement 20 also has a first output shaft 24 in the form of a solid shaft which is connected to a first partial transmission of the multistep transmission 16. In addition, the dual clutch arrangement 20 has a second output shaft 26 in the form of a hollow shaft which is connected to the second partial transmission. The shafts 24, 26 are arranged concentrically with respect to one another.

The dual clutch arrangement 20 has a first friction clutch 28 which is designed to connect the input shaft 22 to the first output shaft 24, and has a second friction clutch 30 which is designed to connect the input shaft 22 to the second output shaft 26.

The two friction clutches 28, 30 are radially nested, with the first friction clutch 28 being arranged radially at the outside and with the second friction clutch 30 being arranged, concentrically with respect thereto, radially at the inside.

The two friction clutches 28, 30 are held in a cage 32 which is connected to the input shaft 22. More precisely, the cage 32 has a first cage section 34 which is connected to the input shaft 22 and extends radially outward from the latter. In addition, the cage 32 has a second cage section 36 which is rotationally fixedly connected to the first cage section 34 and has a cylindrical section, in the form of an outer plate carrier 38 of the first friction clutch 28, and a radially inwardly extending partial section.

An inner plate carrier 40 of the first friction clutch 28 is connected to a first basket 42 which runs directly adjacent to the first cage section 34 and is connected by means of a first toothing 44 to the first output shaft 24.

The second friction clutch 30 has an outer plate carrier 46 which is connected to a second basket 48. The second basket 48 runs in the direct vicinity of the first basket 42 and is connected by means of a second toothing 50 to the second output shaft 26 (the hollow shaft).

As is schematically indicated in the figure, axial bearings can be arranged between the first cage section 34 and the first basket 42 and between the first basket 42 and the second basket 48.

In the figure, 60 denotes a clutch carrier which is mounted so as to be fixed to the housing, that is to say does not rotate.

In addition, schematically illustrated at 58 is a valve arrangement or a hydraulic control arrangement, by means of which the dual clutch arrangement can be operated.

Fastened to the clutch carrier 60 is a rotary leadthrough arrangement 62 which has an axially projecting hollow spigot section 64 which is arranged concentrically around the two output shafts 24, 26. The spigot section 64 extends axially from the side of the second cage section 36 towards and almost as far as the second basket 48 which is connected to the second output shaft 26. Here, the spigot section 64 is situated radially within the two friction clutches 28, 30.

A hub 66 is rotatably mounted on the spigot section 64 of the rotary leadthrough arrangement 62. The figure shows two bearings, by means of which the hub 66 is rotatably mounted on the spigot section 64 of the rotary leadthrough arrangement 62.

The second cage section 36 is rigidly connected to the hub 66, so that the hub 66 forms an input member of the dual clutch arrangement 20 and rotates at the rotational speed of the attached motor 12.

An inner plate carrier 68 of the second friction clutch 30 is fixed to the hub 66.

Between the inner plate carrier 68 and the second cage section 36, a first piston 70 of the first friction clutch 28 is mounted so as to be axially displaceable relative to the hub 66. The piston 70 is of disk-like design and extends from the hub 66 radially outward as far as the first friction clutch 28.

A first piston space 72 is formed between the second cage section 36 and the first piston 70. The first piston space 72 is connected by means of the rotary leadthrough arrangement 62 and the clutch carrier 60 to the valve arrangement 58. By supplying fluid (generally hydraulic fluid such as for example ATF oil) into the first piston space 72 (via the first radial actuating duct 74, see below), the first piston 70 is displaced axially relative to the second cage section 36 and presses the plates of the first friction clutch 28 together, so that said plates come into frictional engagement in order to thereby close the first friction clutch 28 and to connect the input shaft 22 to the first output shaft 24.

The transition from the open state into the closed state of the first friction clutch 28 can take place in a controlled fashion in such a way that a suitable slip phase occurs in order to thereby permit jerk-free starting and gearshifts, respectively. A1

For the purpose of supplying hydraulic fluid into the first piston space 72, a first radial actuating duct 74 (formed for example by means of a plurality of bores which are offset in the peripheral direction) is provided in the hub 66, which first radial actuating duct 74 connects the first piston space 72 to a corresponding first annular duct (not denoted in any more detail in the figure) of the spigot section 64, with the first annular duct in turn being connected, by means of suitable ducts 75 in the rotary leadthrough arrangement 62, to the clutch carrier 60 or to the valve arrangement 58.

Also formed on the inner plate carrier 68 is a web (not denoted in any more detail), against which are supported a plurality of first return springs 76 which are arranged so as to be distributed uniformly about the periphery. The actuation of the first piston 70 accordingly takes place counter to the force of the first return springs 76.

A first centrifugal force equalizing space 78 is provided between the piston 70 and the inner plate carrier 68 of the second friction clutch 30.

The centrifugal force equalizing space 78 has the function of generating a counterforce to a clutch actuating force which is generated by the centrifugal force and is generated in the associated first piston space 72.

At high rotational speeds in particular, the hydraulic fluid which is present in the first piston space 72 is pushed outward in such a way that ultimately a force is exerted on the piston in the direction of actuation of the first friction clutch 28. Said force, in the manner of an interference force, consequently counteracts a return force which is exerted by the return springs 76 as the first friction clutch 28 opens. In order to equalize said "interference force", hydraulic fluid is allowed to flow, unpressurized, into the opposite centrifugal force equalizing space 78. There, as a result of the centrifugal force, a counter-force in the opening direction of the first friction clutch 28 is generated which counteracts said "interference force" and cancels out the latter.

For this purpose, the first centrifugal force equalizing space 78 is connected by means of a first radial auxiliary duct 80 to a second annular duct 82 on the spigot section 64, with the second annular duct 82 in turn being connected by means of corresponding ducts or lines 83 in the rotary leadthrough arrangement 62 to the valve arrangement 58.

A second centrifugal force equalizing space 86 is set up at the other side of the inner plate carrier 68. Said centrifugal force equalizing space 86 is connected by means of a second radial auxiliary duct 84 to the second annular duct 82 of the spigot section 64.

The two centrifugal force equalizing spaces 78, 86 are consequently adjacent to one another and separated from one another by the inner plate carrier 68 of the second friction clutch 30.

The second centrifugal force equalizing space 86 is delimited at the axially other side by a second piston 90 which is likewise mounted so as to be displaceable in the axial direction relative to the hub 66.

A support member 89 is fastened to the hub 66. Said support member 89 extends outward in the radial direction axially between the second piston 90 and the second basket 48. A second piston space 92 is set up between the support member 89 and the second piston 90. The second piston space 92 is connected by means of a second radial actuating duct 94 to a third annular duct on the spigot section 64. The second piston space 92 is connected to the valve arrangement 58 by means of said third annular duct.

Furthermore, second return springs 96 are arranged in the second centrifugal force equalizing space 86, which second return springs 96 are supported against a bearing element 88. The bearing element 88 is in turn supported against a free end of the inner plate carrier 68 or is fixed thereto. The bearing element 88 also serves to delimit the second centrifugal force equalizing space 86 by means of a seal between the bearing element 88 and the second piston 90.

The functioning of the second friction clutch 30 corresponds to that of the first friction clutch 28, merely with the actuating direction being aligned in the opposite direction. While the first piston 70 is arranged at the one side of the two friction clutches 28, 30, the second piston 90 is arranged at the opposite side. The second piston 90 is likewise embodied as a disk-like element, which is mounted on the hub 66 in an axially central region of the second friction clutch 30. The second piston 90 extends radially outward around the second friction clutch 30 from said axially central region. The second centrifugal force equalizing space 86 is hereby arranged substantially radially within the second friction clutch 30. The second return springs 96 are also arranged radially within the second friction clutch 30.

As a result of said measure, the dual clutch arrangement 20 can be designed overall to be particularly compact in the axial direction.

This is also facilitated in that the two centrifugal force equalizing spaces 78, 86 are arranged adjacent to one another and can be connected to the valve arrangement 58 by means of the second annular duct 82 on the spigot section 64 of the rotary leadthrough arrangement 62, that is to say can ultimately be supplied with unpressurized hydraulic fluid via one single duct (a common line).

It is also possible for the friction clutches 28, 30 to be supplied with cooling fluid via the second annular duct 82 or via the radial auxiliary ducts which are arranged so as to be offset in the peripheral direction. Said cooling fluid passes out, for example through bores in the plate carriers, radially outward as a result of the centrifugal forces, and cools the two friction clutches 28, 30. The fluid returns from there (generally via a cooler).

The return springs 76, 96 are illustrated in the figure as coil springs. Plate springs could however also be used instead.

It is particularly preferable that only three peripheral grooves (annular ducts) which are offset in the axial direction are required on the spigot section 64 of the rotary leadthrough arrangement 62 for feeding hydraulic fluid to the dual clutch arrangement 20. This also results in a short axial installation length and a weight advantage.

In order to actuate the friction clutches 28, 30, hydraulic fluid at a pressure in the region of for example 15 bar is introduced in each case into the respective piston spaces 72 and 92.

Although, in the figure, the hub 66 is illustrated with in each case one first radial actuating duct 74, one third radial actuating duct 94 and with two radial auxiliary ducts 80, 84, it is self-evident that corresponding ducts or bores can be arranged so as to be distributed about the periphery of the hub 66.

Figure 2:
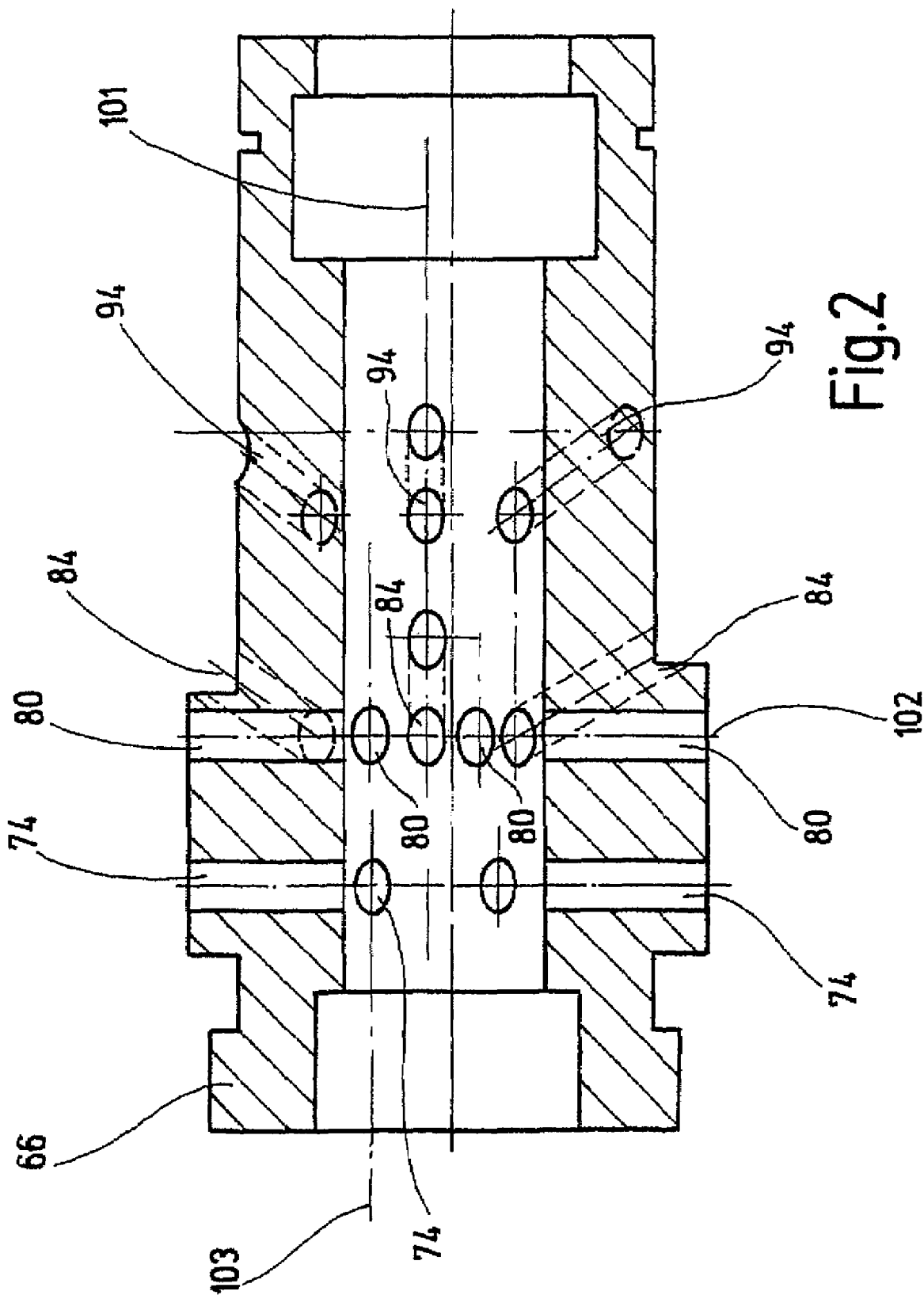
FIG. 2 shows a longitudinal section of a hub of the dual clutch arrangement from FIG. 1.

The hub 66 is illustrated in a longitudinal section view in FIG. 2. It can be seen here that the "radial ducts" 74, 80, 84, 94 can in each case be composed of a plurality of peripherally distributed bores. Here, the bores of the ducts 80, 84 are provided so as to alternate in the peripheral direction. The ducts 80, 84 open out radially at the inside into a common line 102.

The bores of the duct 80 run radially vertically; the bores of the duct 84 run radially outward at an angle.

Bores of the ducts 84, 94 of the clutch 30 open out at the outside in each case one axial line 101. The bores of the ducts 80, 74 correspondingly open out in each case on an axial line 103 which is offset in the peripheral direction.

What is claimed is:

1. A dual clutch arrangement for a dual clutch transmission for motor vehicles, having
  a first and a second friction clutch which are each fluidically actuable, wherein the friction clutches have in each case one input member, with the input members being mounted on a hub and with the hub being rotationally fixedly connected to a drive input shaft, and wherein the hub is mounted for rotation on an axially projecting hollow spigot section of a rotary leadthrough, the spigot section arranged concentrically around two output shafts,
  a first piston arrangement which serves to actuate the first friction clutch and has a first piston, a first piston space and a first centrifugal force equalizing space,
  a second piston arrangement which serves to actuate the second friction clutch and has a second piston, a second piston space and a second centrifugal force equalizing space,
  with the piston spaces and the centrifugal force equalizing spaces being situated in each case on opposite sides of the associated piston and being connected by means of feed lines to a valve arrangement,
  wherein
  the centrifugal force equalizing spaces are connected to the valve arrangement by means of a common line, and
  wherein the rotary leadthrough has an annular duct which forms the common line to the two centrifugal force equalizing spaces.

2. The dual clutch arrangement as claimed in claim 1, wherein the drive input shaft is connected to the hub by means of a cage which radially surrounds the friction clutches.

3. The dual clutch arrangement as claimed in claim 1, wherein the hub has radial ducts in order to supply the friction clutches with fluid.

4. The dual clutch arrangement as claimed in claim 3, wherein the hub has at least two radial actuating ducts for actuating the friction clutches.

5. The dual clutch arrangement as claimed in claim 4, wherein the radial annular duct also serves to supply at least one of the friction clutches with cooling fluid.

6. The dual clutch arrangement as claimed in claim 1, wherein the hub has at least one first radial auxiliary duct, which is connected to the first centrifugal force equalizing space, and at least one second radial auxiliary duct which is connected to the second centrifugal force equalizing space, with the radial auxiliary ducts being connected radially at the inside to the radial annular duct.

7. The dual clutch arrangement as claimed in claim 6, wherein an input member of one of the friction clutches is connected to the hub in a region between the two radial auxiliary ducts.

8. The dual clutch arrangement as claimed in claim 1, wherein the centrifugal force equalizing spaces are fluidically connected to one another.

9. The dual clutch arrangement as claimed in claim 1, wherein the friction clutches are embodied as radially nested multiplate clutches and have in each case one inner plate carrier and one outer plate carrier.

10. The dual clutch arrangement as claimed in claim 9, wherein the input member of the radially outer multiplate clutch is the outer plate carrier and wherein the input member of the radially inner clutch is the inner plate carrier.

11. A dual clutch arrangement for a dual clutch transmission for motor vehicles, having a first and a second friction clutch which are each fluidically actuable, wherein the friction clutches have in each case one input member, with the input members being mounted on a hub and with the hub being rotationally fixedly connected to a drive input shaft, and wherein the hub is mounted on an axially projecting hollow spigot section of a rotary leadthrough, the spigot section arranged concentrically around two output shafts,
  a first piston arrangement which serves to actuate the first friction clutch and has a first piston, a first piston space and a first centrifugal force equalizing space,
  a second piston arrangement which serves to actuate the second friction clutch and has a second piston, a second piston space and a second centrifugal force equalizing space, with the piston spaces and the centrifugal force equalizing spaces being situated in each case on opposite sides of the associated piston and being connected by means of feed lines to a valve arrangement,
  wherein the friction clutches are embodied as radially nested multiplate clutches and have in each case one inner plate carrier and one outer plate carrier, wherein an input member of the radially outer multiplate clutch is the outer plate carrier and wherein an input member of the radially inner clutch is the inner plate carrier, and wherein the centrifugal force equalizing spaces are fluidically connected to one another through the hub.

12. The dual clutch arrangement as claimed in claim 11, wherein the input members are mounted on a hub which is rotationally fixedly connected to a drive input shaft.

13. The dual clutch arrangement as claimed in claim 12, wherein the drive input shaft is connected to the hub by means of a cage which radially surrounds the friction clutches.

14. The dual clutch arrangement as claimed in claim 12, wherein the hub is mounted on a spigot section, which is fixed to a housing, of a rotary leadthrough.

* * * * *